United States Patent
Jiao et al.

(10) Patent No.: US 7,733,669 B2
(45) Date of Patent: Jun. 8, 2010

(54) RESONANT CONVERTER AND BURST MODE STARTING METHOD THEREOF

(75) Inventors: De-Zhi Jiao, Shanghai (CN); Tao Wu, Shanghai (CN); Dong Lin, Shanghai (CN)

(73) Assignee: Delta Electronics, Inc., Taoyuan Hsien (TW)

( * ) Notice: Subject to any disclaimer, the term of this patent is extended or adjusted under 35 U.S.C. 154(b) by 104 days.

(21) Appl. No.: 11/830,427

(22) Filed: Jul. 30, 2007

(65) Prior Publication Data

US 2008/0043494 A1    Feb. 21, 2008

(30) Foreign Application Priority Data

Aug. 17, 2006    (TW) .............................. 95130314 A

(51) Int. Cl.
*H02M 3/335*    (2006.01)
(52) U.S. Cl. .......................................... 363/16; 363/17
(58) Field of Classification Search .................. 363/16, 363/17, 21.01, 21.02, 21.03, 49, 25, 56.06
See application file for complete search history.

(56) References Cited

U.S. PATENT DOCUMENTS 6,018,467 A  *  1/2000  Majid et al. .................... 363/16

* cited by examiner

*Primary Examiner*—Bao Q Vu
*Assistant Examiner*—Jue Zhang
(74) *Attorney, Agent, or Firm*—Volpe and Koenig PC

(57) ABSTRACT

A resonant converter and burst mode starting method thereof are provided. The resonant converter includes a converting stage, a transformer to induce the output of converting stage from the primary side to the secondary side, a rectifying stage to rectify the output of the transformer, a filtering and load stage to filter the output of the rectifying stage, and a charge pump circuit coupled to the transformer or the rectifying stage. The charge pump circuit is for raising a voltage level of the filtering and load stage to higher than a predetermined value so that a feedback voltage of the resonant converter varies. The burst mode of the resonant converter is than started in accordance with the variance.

14 Claims, 10 Drawing Sheets

RESONANT CONVERTER AND BURST MODE STARTING METHOD THEREOF

FIELD OF THE INVENTION

The present invention relates to a resonant converter and burst mode starting method thereof, and more particularly to a resonant DC/DC converter applied to a power supply.

BACKGROUND OF THE INVENTION

Recently, the power supply develops toward high efficiency, high power density, high reliability and low cost the same as the most power manufactures. Especially for the purpose of energy saving and environment protection, lower and lower power loss is required when the power supply operates at light load or zero load condition.

The burst mode control method is more and more widely utilized as a power saving technique for the resonant converter of the power supply. For example, the burst mode control has been introduced into a flyback AC/DC converter of a notebook adapter and a buck DC/DC converter of a mobile phone.

In the burst mode control, when operating at light load or zero load condition, the switching mode power supply operates at the normal switching frequency fs for a period Ton and stops working for another period Toff, and then operates at the normal switching frequency again, wherein 1/(Ton+Toff) is always smaller than fs. And the power loss reduction ratio is Toff/(Ton+Toff).

From the above description, it is understood that the key point of the burst mode control is to generate a signal indicating the load status of the converter and the signal must be easy to be detected to activate the burst mode control. There are many methods in the prior art to detect the load status of the converter such as monitoring the secondary current of the transformer in the converter, or an intermediate voltage e.g. the feedback voltage in close-loop in the switching mode power supply.

The control method for using the close-loop feedback voltage as the intermediate voltage to trigger burst mode control is usually applied in boost type topologies, such as boost, buck boost and flyback, and in buck type topologies, e.g. buck, forward, half bridge and full bridge topologies. When the converter utilizing these topologies operates under light load condition, the operating current is discontinuous (DCM mode), which leads a significant change on the gain of output voltage to input voltage and the significant changes reflects in the sharp voltage variation in the compensation loop. Thus the load status of the converter can be accurately caught through sensing the feedback voltage in the compensation loop.

But it is a little bit difficult using the detecting method of the feedback voltage in the compensation loop in resonant converters. For example, for a resonant DC/DC converter 10 in the prior art as shown in FIG. 1, which is composed of a converting stage 11, a transformer Tx, a rectifying stage 12, and a filtering and load stage 13, wherein the converting stage 11 includes a resonant capacitor Cr, a resonant inductor Lr, and a magnetizing inductor Lm; the rectifying stage 12 includes diodes D1 and D2, and the filtering and load stage 13 includes a filtering capacitor Cout and a load Rload. The working principle of the resonant DC/DC converter 10 is to start with switching a DC voltage via the switches Q1 and Q2, then receiving a high-frequency carrier wave by the converting stage 11, following by rectifying the output of the converting stage 11 by the rectifying stage 12, and finally the output of the rectifying stage 12 is filtered by the filtering and load stage 13 which outputs to the load Rload.

When using the detecting method of the feedback voltage in the compensation loop in the resonant converter 10 as shown in FIG. 1, which is always controlled by FM (frequency method), the operation frequency doesn't change much between different loads. If the operation frequency doesn't have to vary much, the feedback voltage doesn't change much. So it is hard to implement the burst mode control by monitoring an intermediate voltage. The displacing program is to implement the burst mode control by monitoring the secondary current of the transformer Tx, but it is much complicated than the method described above.

In order to overcome the drawbacks in the prior art, a resonant converter and burst mode starting method thereof is provided. The particular design in the present invention not only solves the problems described above, but also is easy to be implemented. Thus, the invention has the utility for the industry.

SUMMARY OF THE INVENTION

In accordance with the present invention, there is provided a resonant converter, which includes a converting stage, a transformer, a rectifying stage, a filtering and load stage, and a charge pump circuit. The transformer is coupled to the converting stage for inducing an output of the converting stage from a primary side to a secondary side thereof. The rectifying stage is coupled to the secondary side of the transformer for rectifying an output of the transformer. And then the filtering and load stage is coupled to the rectifying stage for filtering an output of the rectifying stage. Finally, the charge pump circuit is coupled to the rectifying stage for charging the filtering and load stage to cause a voltage level of the filtering and load stage being higher than a predetermined value, so that a burst mode of the resonant converter is started.

Preferably, the converting stage further includes a resonant circuit, and a magnetizing inductor electrically connected in parallel with the primary side of the transformer and in series with the resonant circuit.

Preferably, the resonant circuit further includes a resonant capacitor, and a resonant inductor electrically connected in series with the resonant capacitor.

Preferably, the rectifying stage is one of a full-wave-rectifier circuit and a full-bridge-rectifier circuit, and has constitutive components thereof being semiconductor elements.

Preferably, the charge pump circuit includes a capacitor, and the capacitor is coupled to at least one of the constitutive components of the rectifying stage.

Preferably, the resonant converter is further electrically connected to a compensation loop having a feedback voltage, wherein the feedback voltage varies when the voltage level of the filtering and load stage is higher than the predetermined value due to a discharge of the charge pump circuit, and the burst mode of the resonant converter is then started in accordance with the variance of the feedback voltage.

In accordance with another aspect of the invention, there is provided a resonant converter, which includes a converting stage, a transformer, a rectifying stage, a filtering and load stage, and a charge pump circuit. The transformer is coupled to the converting stage for inducing an output of the converting stage from a primary side to a secondary side thereof. The rectifying stage is coupled to the secondary side of the transformer for rectifying an output of the transformer. And then the filtering and load stage is coupled to the rectifying stage for filtering an output of the rectifying stage. Finally, the charge pump circuit is coupled to the transformer for charging the filtering and load stage to cause a voltage level of the filtering and load stage being higher than a predetermined value, so that a burst mode of the resonant converter is started.

Preferably, the converting stage further includes a resonant circuit, and a magnetizing inductor electrically connected in parallel with the primary side of the transformer and in series with the resonant circuit.

Preferably, the resonant circuit further includes a resonant capacitor, and a resonant inductor electrically connected in series with the resonant capacitor.

Preferably, the rectifying stage is one of a full-wave-rectifier circuit and a full-bridge-rectifier circuit, and has constitutive components thereof being semiconductor elements.

Preferably, the charge pump circuit includes a capacitor, and the capacitor is coupled to the primary side of the transformer.

Preferably, the charge pump circuit includes a capacitor, and the capacitor is coupled to at least a portion of the second side of the transformer.

Preferably, the resonant converter is further electrically connected to a compensation loop having a feedback voltage, wherein the feedback voltage varies when the voltage level of the filtering and load stage is higher than the predetermined value due to a discharge of the charge pump circuit, and the burst mode of the resonant converter is then started in accordance with the variance of the feedback voltage.

In accordance with a further aspect of the present invention, a burst mode starting method for a resonant converter is provided, wherein the resonant converter comprises a converting stage, a transformer, a rectifying stage, and a filtering and load stage. The burst mode starting method comprises the follow steps: first, raising a voltage level of the filtering and load stage to a relatively higher voltage level so as to vary a feedback voltage of the resonant converter; second, starting the burst mode of the resonant converter in response to the variance of the feedback voltage.

Preferably, the relatively higher voltage level is higher than a predetermined voltage value.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Figure 1:
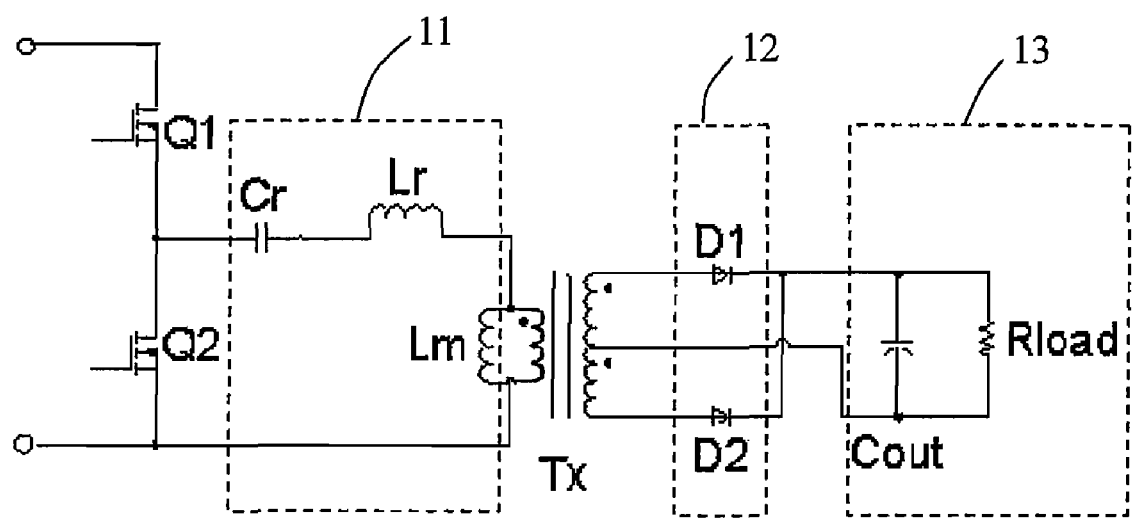
FIG. 1 is a circuit diagram of a resonant DC/DC converter according to the prior art.
Figure 2:
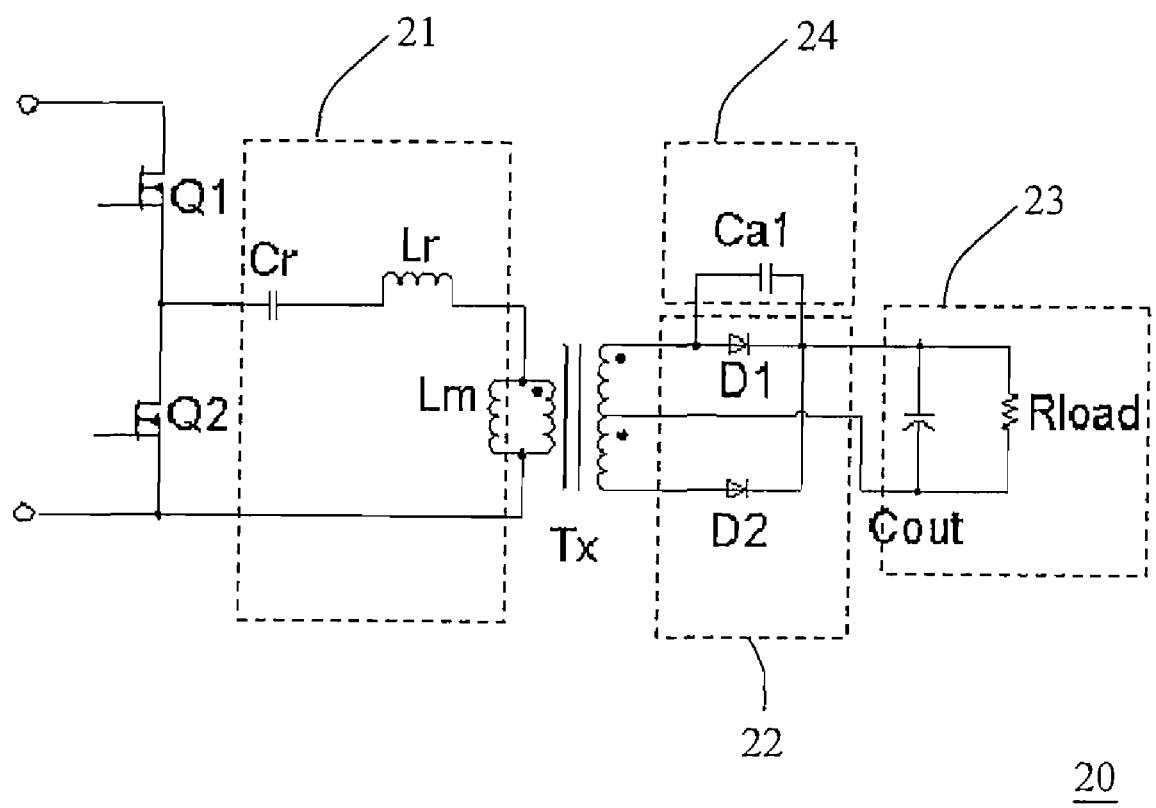
FIG. 2 is a circuit diagram of a resonant converter according to the first preferred embodiment of the present invention.

Please refer to FIG. 2, which is a circuit diagram of a resonant converter according to the first preferred embodiment of the present invention. In FIG. 2, the symbols of the circuit elements are the same as in FIG. 1. Similarly, the resonant DC/DC converter 20 is mainly composed of a converting stage 21, a transformer Tx, a rectifying stage 22, and a filtering and load stage 23, wherein the converting stage 21 includes a magnetizing inductor Lm, and a resonant circuit composed of a resonant capacitor Cr and a resonant inductor Lr electrically connected in series with each other. The rectifying stage 22 includes diodes D1 and D2, and the filtering and load stage 23 is composed of a filtering capacitor Cout and a load Rload.

The working principle of the resonant DC/DC converter 20 is to start with switching a DC voltage via switches Q1 and Q2, then receiving a high-frequency carrier wave by the converting stage 21, following by inducing the output of the converting stage 21 by the transformer Tx from a primary side to a secondary side thereof, and after rectifying the output of the transformer Tx by the rectifying stage 22, finally the filtering and load stage 23 filtering the output of the rectifying stage 22 and outputting to the load Rload.

The difference is that the rectifying stage 22 which is coupled to a circuit 24 functions as a charge pump. As the embodiment illustrated in FIG. 2, the charge pump circuit 24 is composed of a capacitor Ca1 which is coupled in parallel to the diode D1 of the rectifying stage 22. The operational way of the capacitor Ca1 in the present invention is described as follows:

The capacitor Ca1 is charged in one half switching cycle of Q1 turning off and Q2 turning on, and in the other cycle of Q1 turning on and Q2 turning off, Ca1 is discharged and transfers the energy to the rectifying capacitor Cout, which increases the power transferred to the filtering and load stage 23 during each cycle. When the resonant DC/DC converter 20 works in light load operation, this extra energy provided for the rectifying capacitor Cout is so much that the voltage on the rectifying capacitor Cout is charged bigger than a predetermined value—a close-loop set point in converter 20—and meanwhile a feedback voltage in a compensation loop (which is not showed in this figure) connected to the converter 20 will increase the operation frequency to decrease the output voltage in response to this change. When the feedback voltage in the compensation loop is under a trip point, the feedback voltage is easy to be detected by the converter 20 as a signal to trigger the burst mode.

Figure 3:
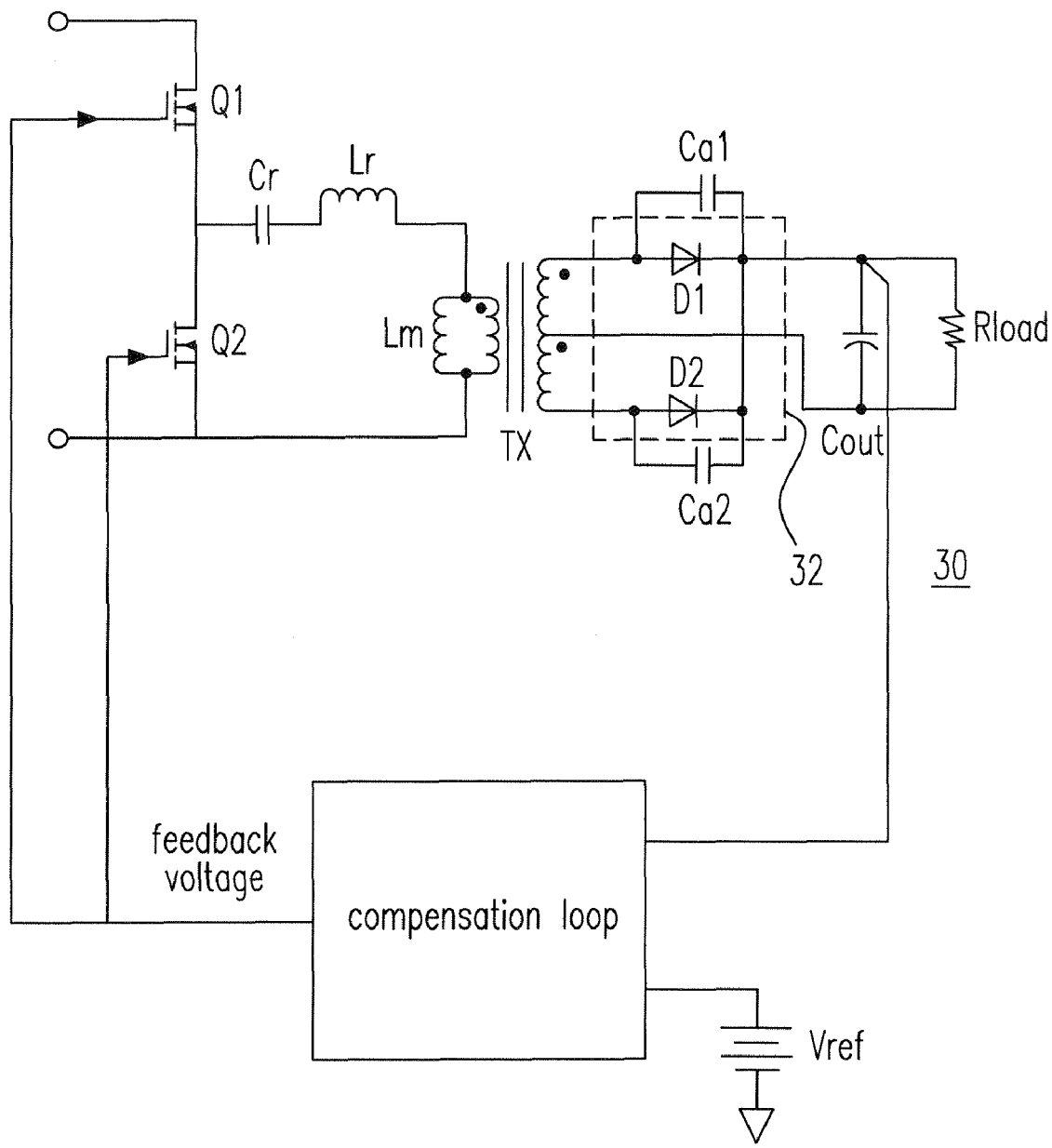
FIG. 3 is a circuit diagram of a resonant converter according to the second preferred embodiment in the present invention.

Please refer to FIG. 3, which is a circuit diagram of a resonant converter according to the second preferred embodiment in the present invention. In FIG. 3, the symbols of the circuit elements are the same as in FIG. 2. In the embodiment, although the rectifying stage 32 use a full-wave rectification which is composed of diodes, two additional capacitors Ca1 and Ca2 are coupled in parallel with two diodes D1 and D2 so as to function the same as that in mentioned embodiment. But there exists a little bit difference that the energy transferred to the output in one half switching cycle is larger than that on the other cycle in the first preferred embodiment, while in this embodiment energy transferred to the output in both two half switching cycle is equal.

Figure 4:
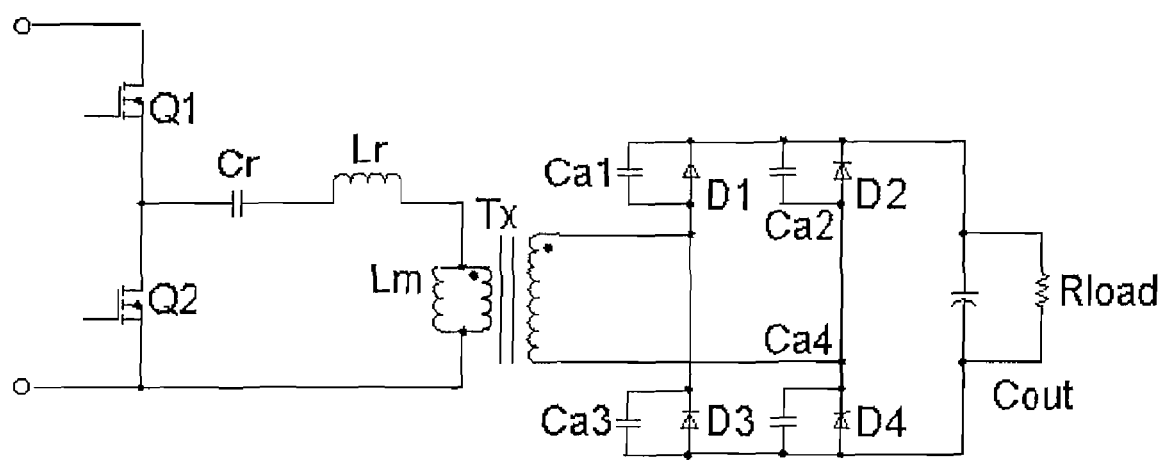
FIG. 4 is a circuit diagram of a resonant converter according to the third preferred embodiment in the present invention.

Please refer to FIG. 4, which is a circuit diagram of a resonant converter according to the third preferred embodiment in the present invention, and the symbols of the circuit elements in FIG. 4 are the same as in FIG. 3, but the difference is that the rectifying stage use the full bridge rectification which is composed of diodes, wherein the four capacitors Ca1~Ca4 are coupled in parallel with the four diodes D1~D4, so as to form the charge pump circuit having the same function of starting the burst mode as described above.

Figure 5:
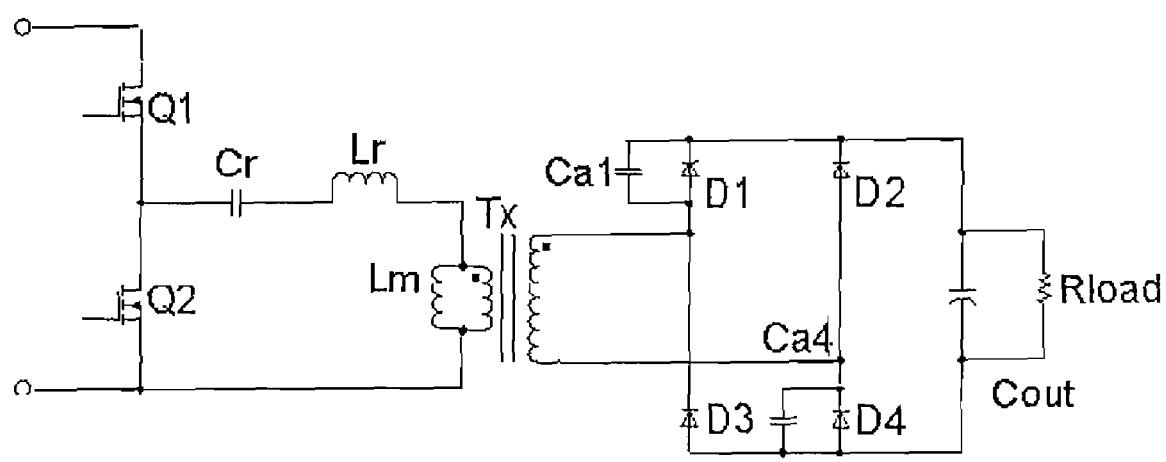
FIG. 5 is a circuit diagram of a resonant converter according to the forth preferred embodiment in the present invention.

Please refer to FIG. 5, which is a circuit diagram of a resonant converter according to the forth preferred embodiment in the present invention, and the symbols of the circuit elements in FIG. 5 are the same as in FIG. 4. In the embodiment, the rectifying stage also use the fall bridge rectification which is composed of diodes, but only two capacitors Ca1 and Ca4 are coupled respectively in parallel with the two diodes D1 and D4, which forms the charge pump circuit having the same function of starting the burst mode as described above.

Figure 6:
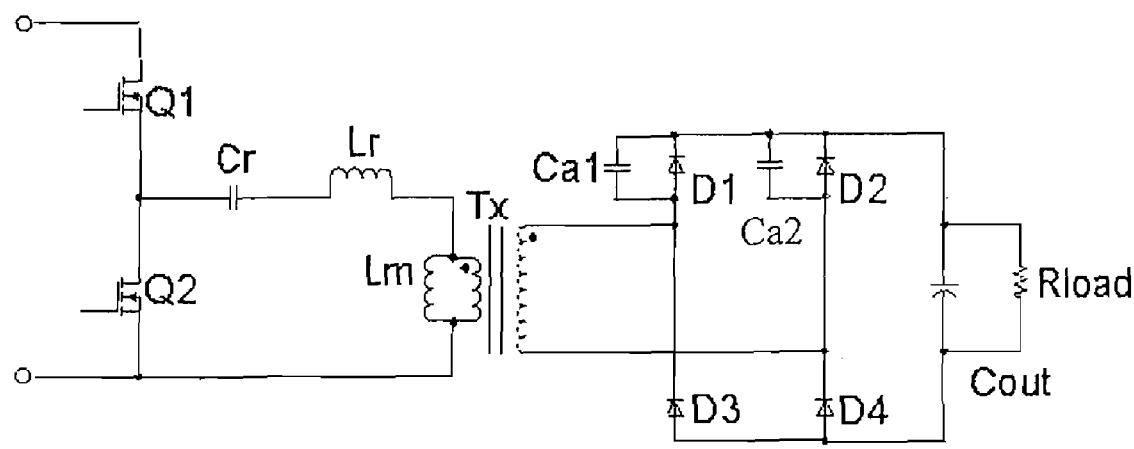
FIG. 6 is a circuit diagram of a resonant converter according to the fifth preferred embodiment in the present invention.

Please refer to FIG. 6, which is a circuit diagram of a resonant converter according to the fifth preferred embodiment in the present invention. The difference between FIG. 5 and FIG. 6 is that two capacitors Ca1 and Ca2, in FIG. 6, are coupled respectively in parallel with the two diodes D1 and D2, which forms the charge pump circuit having the same function of starting the burst mode as described above.

Figure 7:
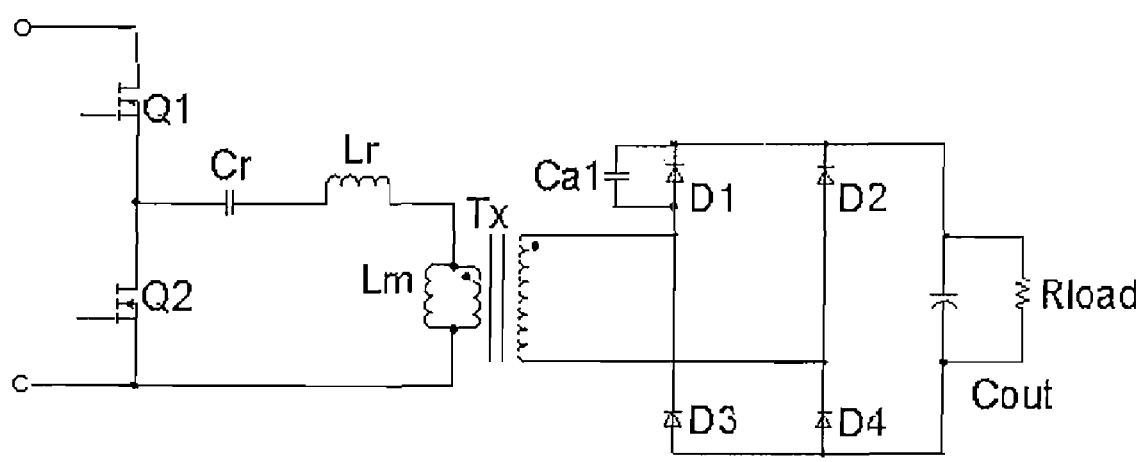
FIG. 7 is a circuit diagram of a resonant converter according to the sixth preferred embodiment in the present invention.

Please refer to FIG. 7, which is a circuit diagram of a resonant converter according to the sixth preferred embodiment in the present invention. The difference between FIG. 6 and FIG. 7 is that only capacitor Ca1, in FIG. 7, is coupled in parallel with the diode D1, so as to form the charge pump circuit having the same function of starting the burst mode as described above.

It is worthy of note that the additional capacitors in the above embodiments from FIGS. 2 to 7 can also be replaced with parasitic capacitors of each rectifying stages.

Figure 8:
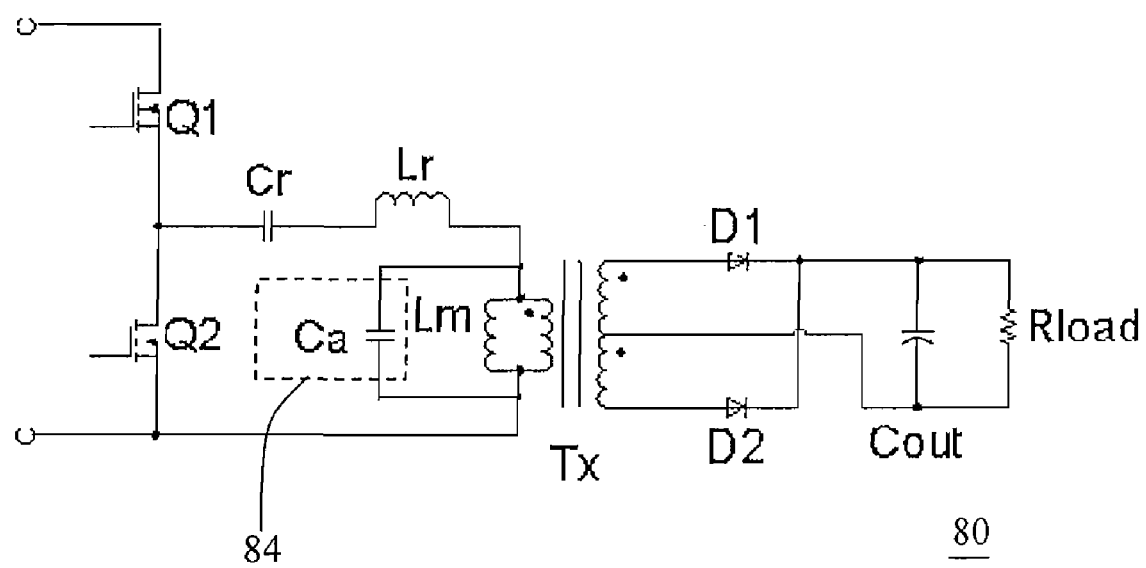
FIG. 8 is a circuit diagram of a resonant converter according to the seventh preferred embodiment in the present invention.

In addition to coupling the charge pump circuit to the rectifying stage, for the ordinary skilled persons in this art, it is achievable to conceive a structure of coupling the charge pump circuit to the transformer Tx, which has the same function as mentioned above. The detail is described as follows:

Please refer to FIG. 8, which is a circuit diagram of a resonant converter according to the seventh preferred embodiment in the present invention, and the meanings of the symbols of the circuit elements in FIG. 8 are the same as in FIG. 2. In the embodiment, the capacitor Ca that includes the charge pump circuit 84 is coupled to the primary side of the transformer Tx so as to achieve the function of starting burst mode as mentioned above.

Figure 9:
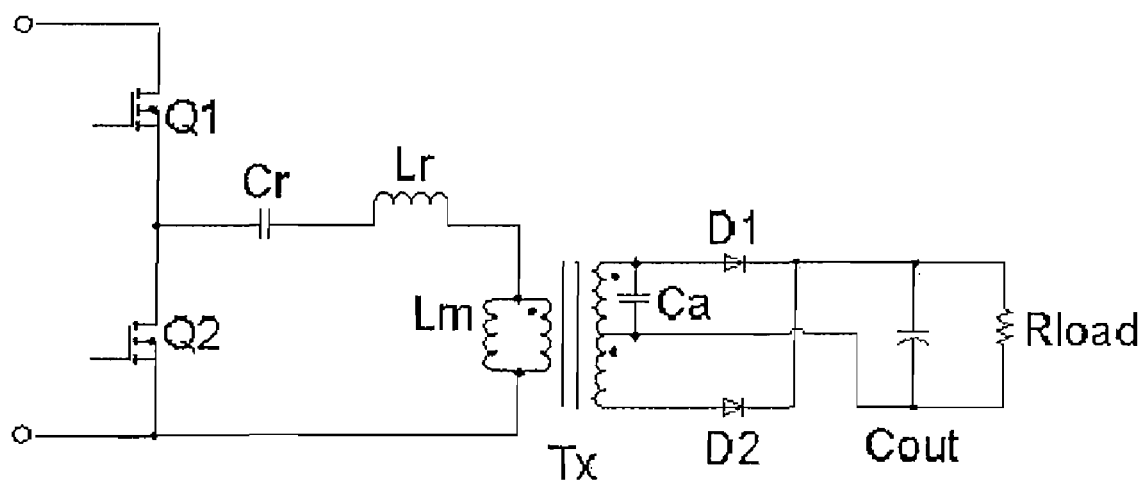
FIG. 9 is a circuit diagram of a resonant converter according to the eighth preferred embodiment in the present invention.

In addition to the circuit diagram as illustrated in FIG. 8, for ordinary skilled persons in this art, the capacitor Ca that includes the charge pump circuit can also be coupled to the secondary side of the transformer Tx and achieve the same function of starting burst mode as mentioned above, which is illustrated in the eighth preferred embodiment of FIG. 9. In FIG. 9, the capacitor Ca is coupled to the secondary side of the center-tap structure transformer Tx, and the ninth preferred embodiment of two additional capacitors Ca1 & Ca2 coupled to the secondary side of the center-tap structure transformer is illustrated in FIG. 10.

Figure 10:
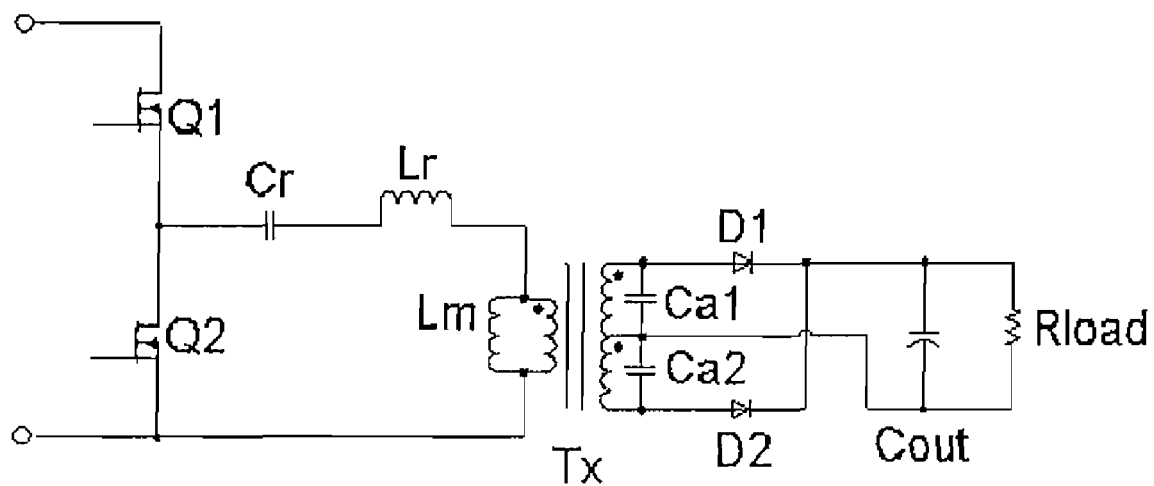
FIG. 10 is a circuit diagram of a resonant converter according to the ninth preferred embodiment in the present invention.

It is worthy of note that the additional capacitors in the above embodiments from FIGS. 8 to 10 can also be replaced with parasitic capacitors of each rectifying stages.

in all embodiments mentioned above, the constitutive components in the rectifying stages thereof are illustrated as diodes, but it is allowed to use other semiconductor elements, such as Mosfet and IGBT etc., as constitutive components.

In conclusion, a resonant converter and burst mode starting method thereof are provided in present invention, which are achieved by coupling additional capacitors to the rectifying stage or the transformer of the traditional converter. This will cause the feedback voltage in the compensation loop of the resonant converter easier to be detected, and the burst mode will be started more suitably and perfectly.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A resonant converter, comprising:
   a converting stage;
   a transformer coupled to the converting stage for inducing an output of the converting stage from a primary side to a secondary side thereof;
   a rectifying stage coupled to the secondary side of the transformer for rectifying an output of the transformer;
   a filtering and load stage coupled to the rectifying stage for filtering an output of the rectifying stage; and
   a charge pump circuit coupled to the rectifying stage for charging the filtering and load stage to cause a voltage level of the filtering and load stage being higher than a predetermined value, so that a burst mode of the resonant converter is started.

2. A resonant converter as claimed in claim 1, wherein the converting stage further comprises:
   a resonant circuit; and
   a magnetizing inductor electrically connected in parallel with the primary side of the transformer, and electrically connected in series with the resonant circuit.

3. A resonant converter as claimed in claim 2, wherein the resonant circuit further comprises:
   a resonant capacitor; and
   a resonant inductor electrically connected in series with the resonant capacitor.

4. A resonant converter as claimed in claim 1, wherein the rectifying stage is one of a full-wave-rectifier circuit and a full-bridge-rectifier circuit, and has constitutive components thereof being semiconductor elements.

5. A resonant converter as claimed in claim 4, wherein the charge pump circuit includes a capacitor, and the capacitor is coupled to at least one of the constitutive components of the rectifying stage.

6. A resonant converter as claimed in claim 1, further electrically connected to a compensation loop having a feedback voltage, wherein the feedback voltage varies when the voltage level of the filtering and load stage is higher than the predetermined value due to a discharge of the charge pump circuit, and the burst mode of the resonant converter is then started in accordance with the variance of the feedback voltage.

7. A resonant converter, comprising:
a converting stage;
a transformer coupled to the converting stage for inducing an output of the converting stage from a primary side to a secondary side thereof;
a rectifying stage coupled to the secondary side of the transformer for rectifying an output of the transformer;
a filtering and load stage coupled to the rectifying stage for filtering an output of the rectifying stage; and
a charge pump circuit coupled to the transformer for charging the filtering and load stage to cause a voltage level of the filtering and load stage being higher than a predetermined value, so that a burst mode of the resonant converter is started.

8. A resonant converter as claimed in claim 7, wherein the converting stage further comprises:
a resonant circuit; and
a magnetizing inductor electrically connected in parallel with the primary side of the transformer, and electrically connected in series with the resonant circuit.

9. A resonant converter as claimed in claim 8, wherein the resonant circuit further comprises:
a resonant capacitor; and
a resonant inductor electrically connected in series with the resonant capacitor.

10. A resonant converter as claimed in claim 7, wherein the rectifying stage is one of a full-wave-rectifier circuit and a full-bridge-rectifier circuit, and has constitutive components thereof being semiconductor elements.

11. A resonant converter as claimed in claim 7, wherein the charge pump circuit includes a capacitor, and the capacitor is coupled to the primary side of the transformer.

12. A resonant converter as claimed in claim 7, wherein the charge pump circuit is includes a capacitor, and the capacitor is coupled to at least a portion of the second side of the transformer.

13. A resonant converter as claimed in claim 7, further electrically connected to a compensation loop having a feedback voltage, wherein the feedback voltage varies when the voltage level of the filtering and load stage is higher than the predetermined value due to a discharge of the charge pump circuit, and the burst mode of the resonant converter is then started in accordance with the variance of the feedback voltage.

14. A burst mode starting method for a resonant converter, wherein the resonant converter comprises a converting stage, a transformer, a rectifying stage, and a filtering and load stage, and the method comprises the follow steps:
raising a voltage level of the filtering and load stage higher than a predetermined voltage value so as to vary a feedback voltage of the resonant converter;
starting the burst mode of the resonant converter in response to the variance of the feedback voltage; and
causing a voltage level of the filtering and load stage to be higher than a predetermined value using a charge pump circuit coupled to the transformer, so that a burst mode of the resonant converter is started.

* * * * *